(12) United States Patent
Greene

(10) Patent No.: US 7,925,856 B1
(45) Date of Patent: Apr. 12, 2011

(54) METHOD AND APPARATUS FOR MAINTAINING AN AMOUNT OF RESERVE SPACE USING VIRTUAL PLACEHOLDERS

(75) Inventor: Christopher Greene, Longwood, FL (US)

(73) Assignee: Symantec Corporation, Mountain View, CA (US)

( * ) Notice: Subject to any disclaimer, the term of this patent is extended or adjusted under 35 U.S.C. 154(b) by 575 days.

(21) Appl. No.: 12/006,050

(22) Filed: Dec. 28, 2007

(51) Int. Cl.
*G06F 12/00* (2006.01)
(52) U.S. Cl. ........ 711/170; 711/161; 711/162; 707/648; 707/672; 707/674; 707/679; 707/682
(58) Field of Classification Search .................. 711/161, 711/162, 170; 707/648, 672, 674, 679, 682
See application file for complete search history.

(56) References Cited

U.S. PATENT DOCUMENTS

2008/0228834 A1* 9/2008 Burchall et al. .............. 707/202
* cited by examiner

*Primary Examiner* — Jasmine Song
(74) *Attorney, Agent, or Firm* — Campbell Stephenson LLP

(57) ABSTRACT

A method and apparatus for maintaining an amount of reserve space using virtual placeholders. In one embodiment, a method of using placeholders for log files to maintain an amount of reserve storage space comprises determining a first required log file, wherein the first required log file is to be used to recover a database volume, generating at least one placeholder for representing at least one required log file in a log volume and storing the first required log file and the at least one placeholder in a portion of the log volume, wherein the at least one placeholder is used to control a size of the portion of the log volume.

20 Claims, 4 Drawing Sheets

US 7,925,856 B1

METHOD AND APPARATUS FOR MAINTAINING AN AMOUNT OF RESERVE SPACE USING VIRTUAL PLACEHOLDERS

BACKGROUND OF THE INVENTION

1. Field of the Invention

Embodiments of the present invention generally relate to data protection and recovery systems and, more particularly, to a method and apparatus for maintaining an amount of reserve space using virtual placeholders.

2. Description of the Related Art

Normally, database applications (e.g., MICROSOFT Exchange Server) create log files to track operations performed on database files. The log files are used to recover the database files upon an occurrence of a data loss event (e.g., a database files are corrupted, a server fails and the like). For example, the Exchange Server creates log files every time a message activity is conducted by a user (e.g., a message is created, sent, deleted, received and the like). Exchange Server stores the log files and the database files in log volumes and database volumes, respectively.

System administrators are tasked with the duty to maintain and secure computer systems. For example, the system administrators are responsible for configuring storage resources and processes related to the Exchange Server in conformity with established best practices and guidelines. Such best practices and guidelines may provide examples for estimating a size of storage space for a log volume in various backup scenarios. For example, incremental backup images accumulate a large number of log files. These log files must be maintained to facilitate restoration of the backup. Occasionally, the system administrators underestimate the size of the storage space needed for the files, which disrupts the restoration and/or recovery processes. System administrators need to ensure there is always enough space for the restoration and/or recovery processes to continue. For example, the recovery process cannot begin until the restoration process is completed.

The recovery process associated with the Exchange Server replays the database using the log files and the database files. Most of the time, the log files need to be restored from a storage device (e.g., a tape drive, a disk drive and the like) before they are applied to the database files. The log files are restored to the log volume and quickly fill up the storage space allocated to the log volume. When there is not enough storage space for the restoration and/or recovery processes to continue, the database is not recovered causing a loss of productivity and an increase in expenses.

Therefore, there is a need in the art for a method and apparatus for maintaining an amount of reserve space using virtual placeholders during database recovery.

SUMMARY OF THE INVENTION

Embodiments of the present invention generally comprise a method and apparatus for maintaining an amount of reserve space using virtual placeholders. In one embodiment, the method comprises determining a first required log file, wherein the first required log file is to be used to recover a database volume, generating at least one placeholder for representing at least one required log file in a log volume and storing the first required log file and the at least one placeholder in a portion of the log volume, wherein the at least one placeholder is used to control a size of the portion of the log volume.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
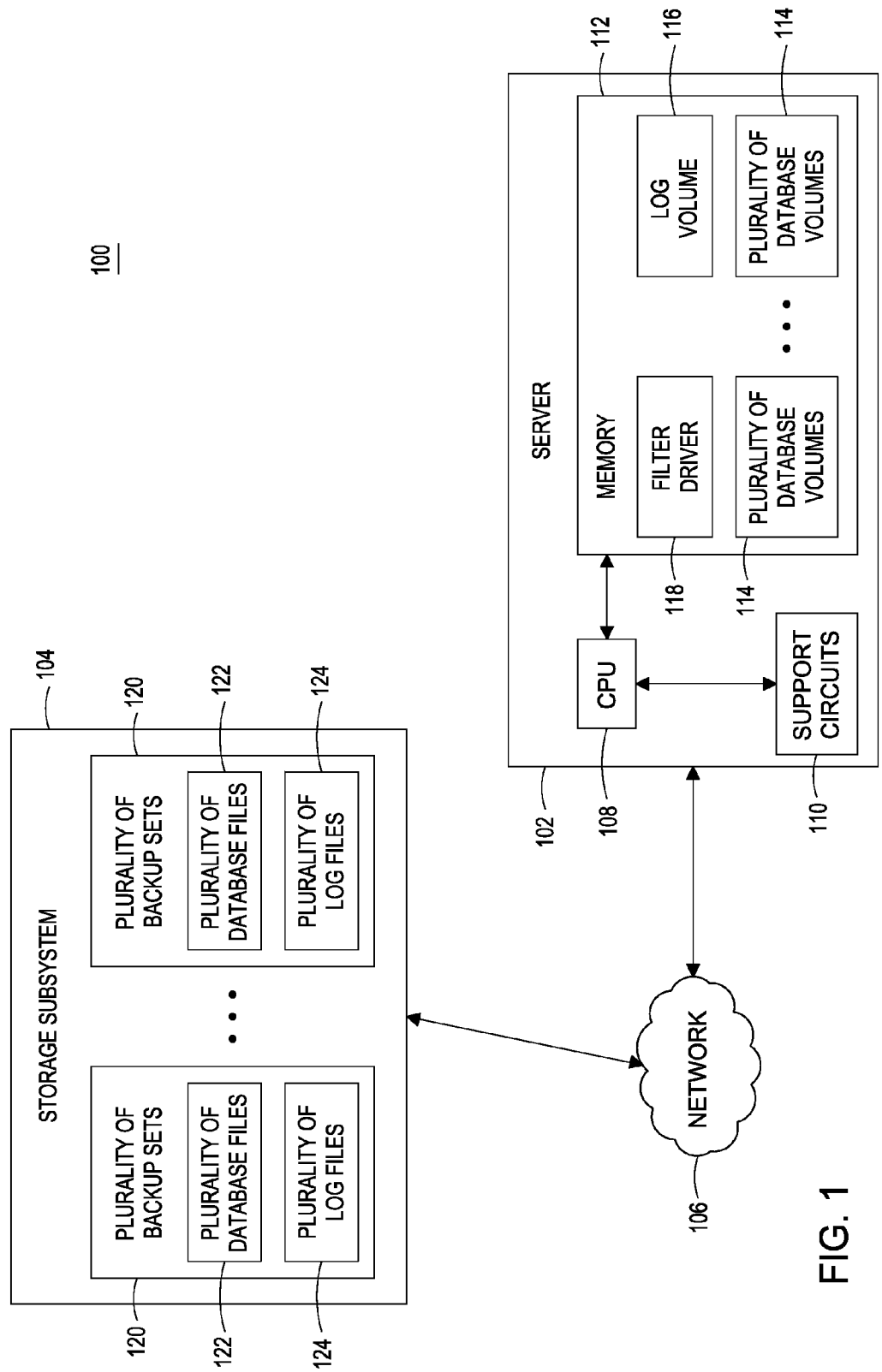
FIG. 1 is a block diagram of a system for using virtual placeholders to maintain an amount of reserve storage space in accordance with various embodiments of the present invention.

FIG. 1 is a block diagram of a system 100 for using virtual placeholders to maintain an amount of reserve storage space. The system 100 comprises a server 102 and a storage subsystem 104, each coupled to one another through a network 106.

Generally, the storage subsystem 104 comprises a collection of data storage technologies (e.g., tape library, ATA disk arrays, Fibre Channel disk arrays, ISCSI (Internet SCSI) block devices and the like). The storage subsystem 104 comprises a plurality of storage volumes, such as a plurality of backup sets 120 for maintaining a plurality of database files 122 and a plurality of log files 124 associated with a server (e.g., MICROSOFT EXCHANGE SERVER) for file recovery purposes. The plurality of backup sets 120 may be image chains (e.g., a full backup base image and one or more incremental images). The plurality of backup sets 120 may also be stored on any form of media, such as magnetic tape or disk.

The network 106 comprises a communication system that connects a computer system by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the intranet using various communications infrastructure such as Ethernet, WiFi, WiMax, General Packet Radio Service (GPRS), and the like.

The server 102 comprises a central processing unit (CPU) 108, various support circuits 110 and a memory 112. The CPU 108 may comprise one or more commercially available microprocessors or microcontrollers that facilitate data processing and storage. The various support circuits 116 facilitate operation of the CPU 108 and comprise at least one of clock circuits, power supplies, cache, input/output circuits, and the like. The memory 112 comprises at least one of read only memory (ROM), random access memory (RAM), disk drive storage, optical storage, removable storage, and the like.

The memory 112 further includes various software packages, such as a filter driver 118. The memory 112 further includes various volumes, such as a plurality of database volumes 114 and a log volume 116 for storing database files and log files, respectively. In one embodiment, the server 102 is a target server for a database application. During a recovery process, the log files in the log volume 116 are applied to the database files to restore the plurality of database volumes 114 for use by the database application.

The filter driver 118 is a software package configured to control input/output operations to the log volume 116. Conceptually, the filter driver 118 is between the log volume 116 and the database application according to one embodiment. The database application sends read requests for log files in the log volume 116 to the file driver 118. The filter driver 118 performs the read request in accordance with various embodiments of the present invention. The filter driver 118 is further configured to generate virtual placeholders to be used in controlling a size of the log volume 116 (e.g., during a recovery process) to prevent the log volume from exceeding a storage space limit (e.g., maintaining an amount of reserve space). If the storage space limit is exceeded (e.g., log file data is stored in the reserve space), restoration and/or recovery processes are disrupted and/or unable to proceed.

The filter driver 118 is further configured to reclaim space in the log volume 116 by replacing a log file that has already been used by the database application with the virtual placeholder. The filter driver 118 is further configured to determine a log file required for the recovery process (e.g., through an examination of a header for a restored database file). The filter driver 118 is further configured to determine the first required log file amongst the plurality of log files 124 in the plurality of backup sets 120.

Generally, the virtual placeholders are sparse files in a New Technology File System (NTFS). The virtual placeholder enables the database application to issue read requests for a log file and the filter driver 118 to hold the read request until actual data associated with the log file has been restored from the plurality of backup sets 120. The database application sees full log files on the log volume in positions where virtual placeholders are stored. As described further below, the virtual placeholders are used by the filter driver 118 to maintain the amount of reserve storage space.

Figure 2:
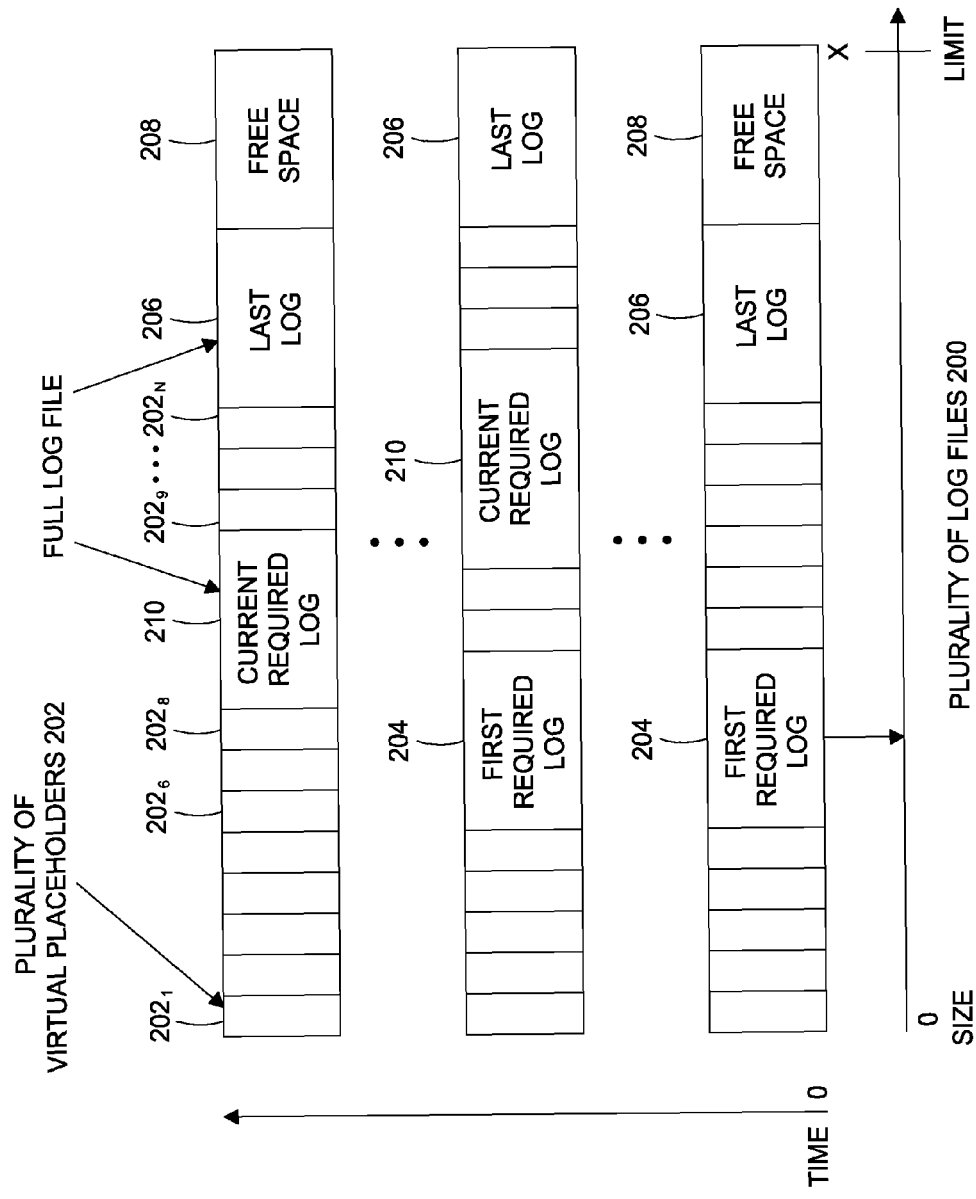
FIG. 2 is an illustration of a plurality of log files comprising a plurality of virtual placeholders during a recovery process in accordance with various embodiments of the present invention.

FIG. 2 is an illustration of a plurality of log files 200 comprising a plurality of virtual placeholder files 202. As mentioned above, the plurality of log files 200 are used by a database application during a recovery process on a database file. As the recovery process progresses, one or more log files of the plurality of log files 200 are read by the database application and application to the database file. FIG. 2 illustrates such a progression with three states of the plurality of log files 200 during the recovery process, as explained below.

As mentioned above, a filter driver determines a first required log file 204 amongst a plurality of log files in a backup set. The first required log file and a last log file 206 are fully restored to a log volume, as illustrated in a first state of the recovery process. In a second state of the recovery process, the database application issues a read request for a current required log file 210 and an associated virtual placeholder is replaced by actual data of the current required log file 210. As the recovery process continues and one or more virtual placeholders of the plurality of virtual placeholders 202 are replaced with actual data, a size of the plurality of log files 202 increases until it reaches a limit (i.e., a reserve amount of space). To prevent the plurality of log files 200 from exceeding the limit, the filter driver replaces a previously read log file, such the first required log file 204 with a virtual placeholder in order to free up space (e.g., a free space 208) on the log volume, as illustrated in a third state of the recovery process.

Figure 3:
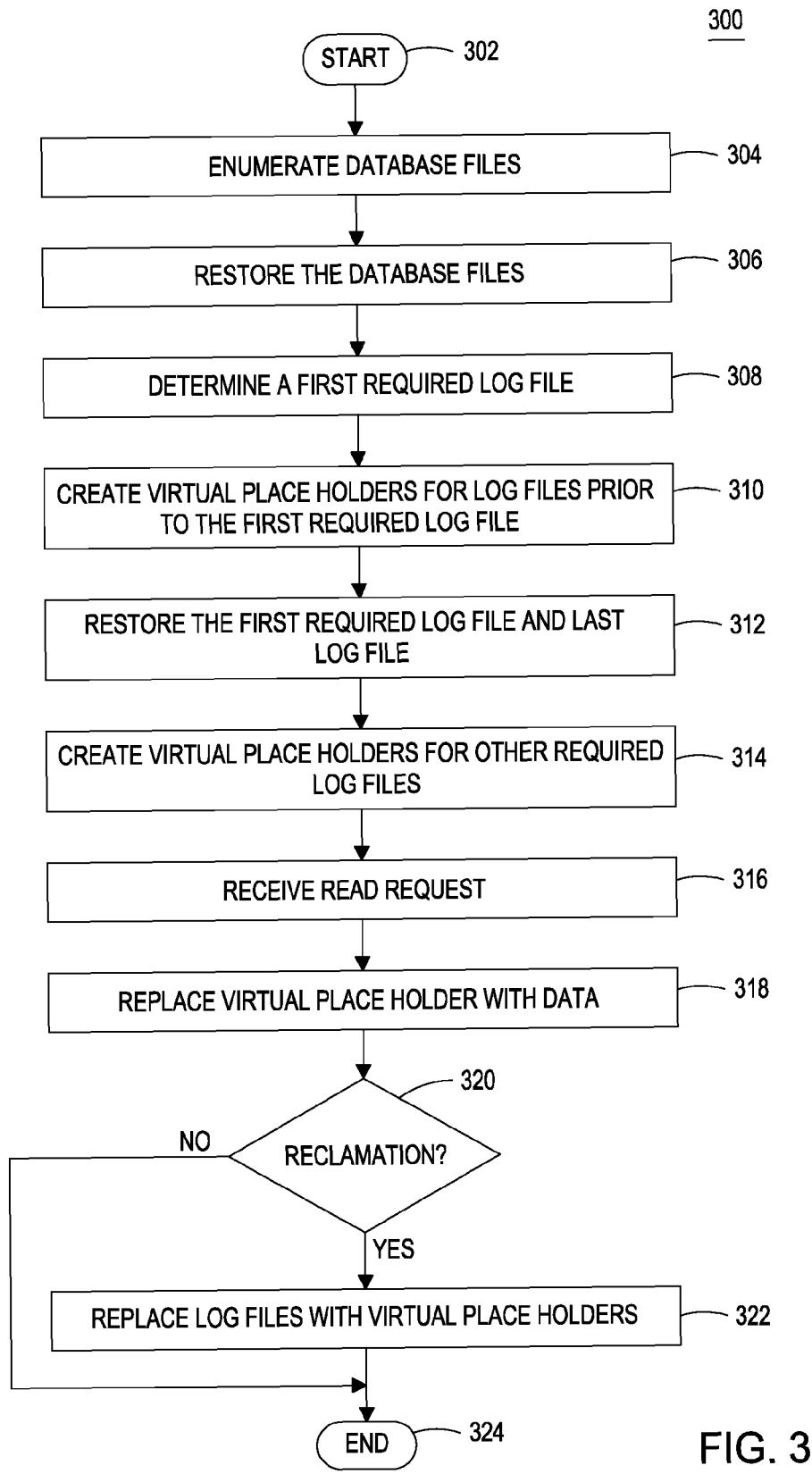
FIG. 3 is a flow diagram of a method of using virtual placeholders to maintain an amount of reserve storage space associated with a log volume in accordance with various embodiments of the present invention.

FIG. 3 is a flow diagram of a method 300 for using virtual placeholders to maintain an amount of reserve storage space associated with a log volume. As mentioned above, the plurality of log files are used by a database application to restore a database file during a recovery process. The method 300 begins at step 302 and proceeds to step 304.

At step 304, database files within a backup set are enumerated. For example, the recovery process determines the database files needed to restore database volumes and the backup sets in which the database files are stored. Image files within the backup sets are examined to identify the database files. At step 306, database files are restored to database volumes. In one embodiment, the database files, a first required log file and a last log file are at the beginning of a backup set as stored on a tape in a tape drive. In another embodiment, the log files are stored in order on the tape (e.g., order in which the log files are required for the recovery process). At step 308, a first required log file is determined. In one embodiment, the database files are analyzed to determine the first required log file. For example, headers of the database files are examined by a filter driver to determine log files required for the recovery process. In one or more embodiments, step 308 is performed during a backup process on the tape drive.

At step 310, virtual placeholders are created for log files prior to the first required log file. At step 312, the first required log file and the last log file are restored to the plurality of log files associated with the log volume. At step 314, virtual placeholders are created for other required log files (i.e., log files between the first required log file and the last log file). In one embodiment, a reserve amount of disk space is computed for the log volume. The reserve amount of disk space may be a portion of the log volume in which no data is stored to prevent disruptions to restoration and recovery processes. Hence, the reserve amount of disk space establishes a disk space limit for the plurality of log files in the log volume. The log volume cannot use the reserve amount of disk space for storing log files. More specifically, the recovery process cannot restore log files such that the log files consume any portion of the reserve amount of disk space. According to some embodiments, the recovery process may create various other files that consume some of the reserve amount of disk space.

At step 316, a read request is received for a current required log file. In one embodiment, the filter driver holds the read request until actual data is available. At step 318, a virtual placeholder in the plurality of log files is replaced with actual data for the current required log file. At step 320, a determination is made as to whether a log file in the plurality of log files requires reclamation. For example, once the log file is closed, storage space for storing the log file may be reclaimed. If a log file in plurality of log files requires reclamation, then the method 300 proceeds to step 322. At step 322, the log file (e.g., previously used by the recovery process) in the plurality of log files is replaced with a virtual placeholder in order to free space and avoid encroaching on a reserve amount of space. In one embodiment, one or more log files prior to the current required log file are replaced with virtual placeholders. If none of the plurality of log files require reclamation, then the method 300 proceeds to step 324. At step 324, the method 300 ends.

Figure 4:
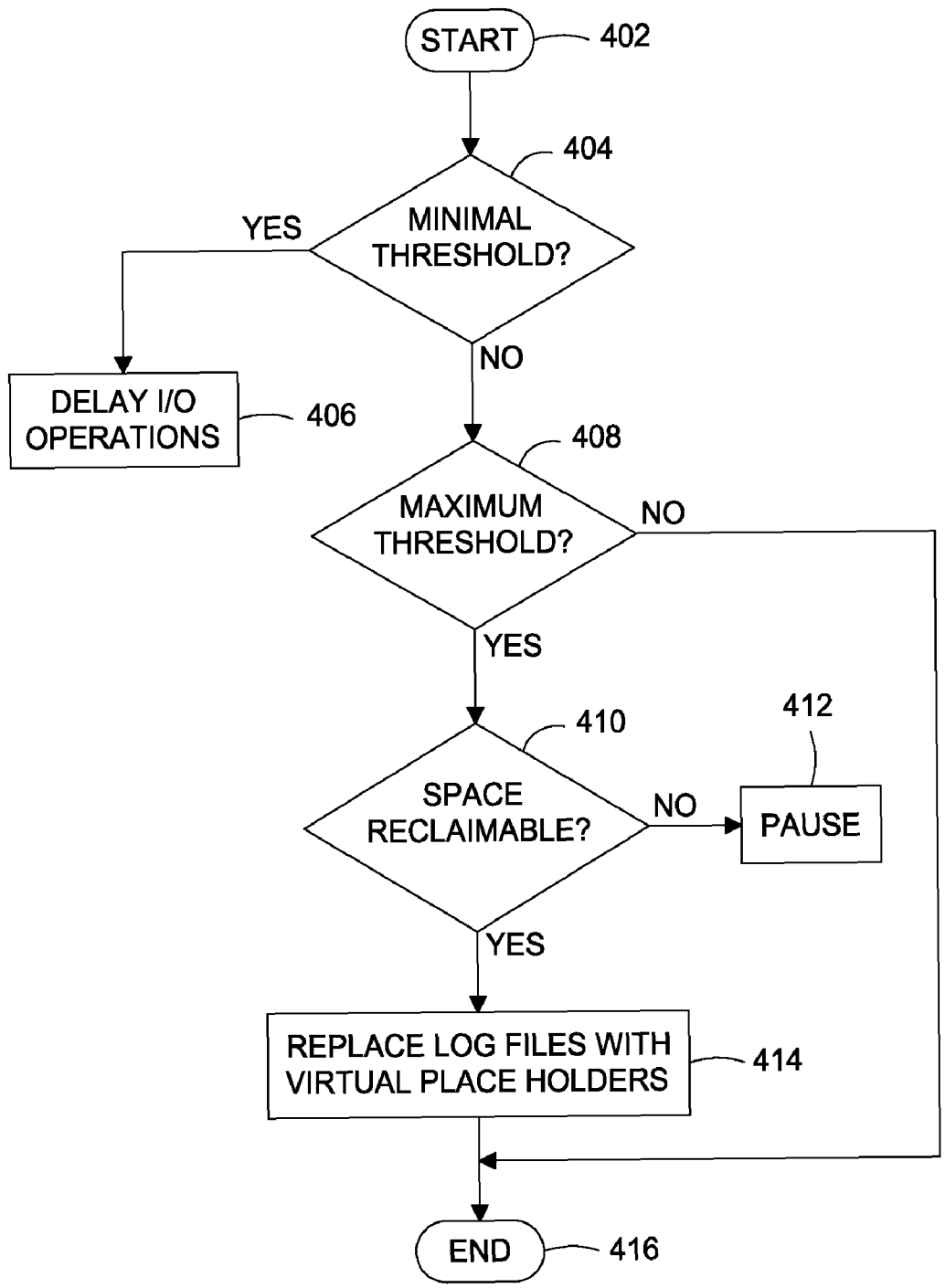
FIG. 4 is a flow diagram of a method of throttling a plurality of Input/Output operations associated with a log volume in accordance with various embodiments of the present invention.

FIG. 4 is a flow diagram of a method 400 for throttling Input/Output operations at a log volume. During the method 400, a recovery process for a database application is being performed on log files and database files. The method 400 begins at step 402 and proceeds to step 404.

At step 404, a determination is made as to whether a minimal threshold has been reached with respect to a number of unprocessed log files already. In one embodiment, a filter driver performs the determination at step 404. If the minimal threshold has been reached, then the method 400 proceeds to step 406. For example, the minimal threshold is reached when the recovery process is proceeding faster than the restoration of the log files. At step 406, responses to I/O requests are delayed in order to match a rate of log file replay into a database with a rate of restore. In one embodiment, the filter driver delays the responses to the I/O requests. If the minimal threshold has not been reached, then the method 400 proceeds to step 408.

At step 408, a determination is made as to whether a maximum threshold has been reached. For example, the maximum threshold has been reached when the plurality of log files has reached a limit on storage space as defined by a reserve amount of storage space. The log files are being restored at a rate faster than the log files are being replayed into the database. If the maximum threshold has been reached, the method 400 proceeds to step 410. At step 410, a determination is made as to whether any portion of the storage space is reclaimable. If a portion of the storage space can be reclaimed, the method 400 proceeds to step 414. At step 414, one or more log files of the plurality of log files are replaced with one or more virtual placeholders. For example, a virtual placeholder is generated to replace a previously processed log file to free up storage space. If there is not a single portion of storage space that is available for reclamation through virtual placeholders, the method 400 proceeds to step 412. At step 412, restoration of the log files is paused until specified amount of space is available for reclamation. If the maximum threshold has not been reached, the method 400 proceeds to step 416. At step 416, the method 400 ends.

While the foregoing is directed to embodiments of the present invention, other and further embodiments of the invention may be devised without departing from the basic scope thereof, and the scope thereof is determined by the claims that follow.

What is claimed is:

1. A method of using placeholders for log files to maintain an amount of reserve storage space, comprising:
    determining a first required log file from at least one backup set for a database, wherein the first required log file is to be used to recover a database volume;
    generating at least one file as at least one placeholder referencing at least one required log file in the at least one backup set; and
    storing the first required log file and the at least one placeholder with a portion of a log volume, wherein the at least one placeholder is used to control a size of the portion of the log volume.

2. The method of claim 1 further comprising:
    storing a last required log file with the portion of the log volume.

3. The method of claim 1, wherein determining the first required log file further comprises analyzing a database file to determine the first required log file.

4. The method of claim 1, wherein storing the first required log file and the at least one placeholder further comprises arranging the at least one placeholder in the portion of the log volume.

5. The method of claim 1, further comprising:
    performing a recovery process on the log volume.

6. The method of claim 1 further comprising:
    replacing a first placeholder of the at least one placeholder with data associated with a current required log file.

7. The method of claim 1 further comprising:
    replacing a second log file with a second placeholder.

8. The method of claim 1 further comprising:
    replacing a third log file with a third placeholder, wherein the third log file is prior to a current required log file.

9. The method of claim 1 further comprising:
    throttling a plurality of input/output operations associated with the log volume.

10. The method of claim 9, wherein throttling the plurality of input/output operations further comprises delaying the plurality of input/output operations if a defined number of unprocessed log files is reached.

11. The method of claim 9, wherein throttling the plurality of input/output operations further comprises replacing a fourth log file on the log volume with a fourth placeholder if a defined size of the at least one log file is reached.

12. An apparatus for using placeholders for log files to maintain an amount of reserve storage space, comprising:
    a memory comprising a log volume for storing at least one required log file from at least one backup set for a database;
    a filter driver for determining a first required log file, wherein the first required log file is to be used to recover a database volume, generating at least one file as at least one placeholder referencing the at least one required log file in the at least one backup set, and storing the first required log file and the at least one placeholder in the memory, wherein the at least one placeholder is used to control a size of the memory allocated to the log volume.

13. The apparatus of claim 12, wherein the filter driver replaces a first placeholder of the at least one placeholder with data associated with a current required log file.

14. The apparatus of claim 12, wherein the filter driver replaces a second log file with a second placeholder.

15. The apparatus of claim 12, wherein the filter driver replaces a third log file with a third placeholder, wherein the third log file is prior to a current required log file.

16. The apparatus of claim 12, wherein the filter driver throttles a plurality of input/output operations associated with the log volume.

17. A system for using placeholders for log files to maintain an amount of reserve storage space, comprising:
    a storage subsystem, comprising:
        a plurality of backup sets comprising a plurality of database files and a plurality of log files;
    a server, comprising:
        a memory comprising a log volume for storing at least one required log file from the plurality of backup sets,
        a filter driver for determining a first required log file, wherein the first required log file is to be used to recover a database volume, generating at least one file as at least one placeholder referencing the at least one required log file in the plurality of backup sets, and storing the first required log file from an associated backup set of the plurality of backup sets and the at least one placeholder in the memory, wherein the at least one placeholder is used to control a size of the memory allocated to the log volume.

18. The system of claim 17, further comprising:
    analyzing a database file of the plurality of database files to determine the first required log file.

19. The system of claim 17 further comprising:
    a database application for performing a recovery process on the plurality of database files and the plurality of log files.

20. The system of claim 17, wherein the plurality of backup sets are stored within at least one of a tape drive or a disk drive.

* * * * *